US011848972B2

(12) United States Patent
Adams et al.

(10) Patent No.: US 11,848,972 B2
(45) Date of Patent: Dec. 19, 2023

(54) MULTI-DEVICE AUDIO STREAMING SYSTEM WITH SYNCHRONIZATION

(71) Applicant: HapTech Holdings, Inc., Woodland Hills, CA (US)

(72) Inventors: Richard Adams, Rolling Hills Estates, CA (US); Dave Hargreaves, Cambridge (GB); Elisa Moncayo, Fullerton, CA (US); Brock Maxwell Seiler, Jefferson Valley, NY (US)

(73) Assignee: HAPTECH HOLDINGS, INC., Woodland Hills, CA (US)

( * ) Notice: Subject to any disclaimer, the term of this patent is extended or adjusted under 35 U.S.C. 154(b) by 0 days.

(21) Appl. No.: 16/333,438

(22) PCT Filed: Sep. 14, 2017

(86) PCT No.: PCT/US2017/051607
§ 371 (c)(1),
(2) Date: Mar. 14, 2019

(87) PCT Pub. No.: WO2018/053159
PCT Pub. Date: Mar. 22, 2018

(65) Prior Publication Data
US 2019/0215349 A1    Jul. 11, 2019

Related U.S. Application Data

(60) Provisional application No. 62/394,707, filed on Sep. 14, 2016.

(51) Int. Cl.
*H04L 29/06*    (2006.01)
*G06F 3/01*    (2006.01)
(Continued)

(52) U.S. Cl.
CPC .............. *H04L 65/60* (2013.01); *A63F 13/00* (2013.01); *A63F 13/235* (2014.09);
(Continued)

(58) Field of Classification Search
CPC ........ H04L 65/60; H04L 65/80; A63F 13/235; A63F 13/285; A63F 13/327; A63F 13/54;
(Continued)

(56) References Cited

U.S. PATENT DOCUMENTS 9,319,792 B1 *    4/2016   Coleman ................. H04R 3/12
9,501,946 B1 *    11/2016  Kulkarni ............... G06F 3/0346
(Continued)

FOREIGN PATENT DOCUMENTS

JP    2009188674 A    8/2009
JP    2010532181 A    10/2010
(Continued)

OTHER PUBLICATIONS

The International Bureau of WIPO, International Preliminary Report on Patentability in International Application No. PCT/US2017/051607 (dated Mar. 19, 2019).
(Continued)

*Primary Examiner* — Kevin T Bates
*Assistant Examiner* — Chen-Liang Huang
(74) *Attorney, Agent, or Firm* — Ziegler IP Law Group

(57) ABSTRACT

Embodiments include an electronic control unit comprising an audio input device for receiving an audio stream from an external audio source, the audio stream being split between an audio path and a haptic path; a wireless transceiver in the haptic path for transmitting the audio stream to at least one wearable haptic device using short-range wireless communication; and a processor coupled to the transceiver and configured to calculate an amount of latency associated with transmission of the audio stream to the wearable haptic (Continued)

device(s), and partition the audio stream into a plurality of audio packets including a time-to-play based on the calculated latency. The control unit further includes a buffer in the audio path for inserting a time delay into the audio stream based on the calculated latency, and an audio output device in the audio path for outputting the time-delayed audio stream to an external audio listening device.

16 Claims, 5 Drawing Sheets

(51) Int. Cl.
| | |
|---|---|
| G06F 3/16 | (2006.01) |
| A63F 13/235 | (2014.01) |
| A63F 13/285 | (2014.01) |
| A63F 13/00 | (2014.01) |
| H04B 1/3827 | (2015.01) |
| A63F 13/54 | (2014.01) |
| A63F 13/327 | (2014.01) |
| A63F 13/215 | (2014.01) |
| G10L 21/16 | (2013.01) |
| H04L 65/60 | (2022.01) |
| H04L 65/80 | (2022.01) |

(52) U.S. Cl.
CPC .......... *A63F 13/285* (2014.09); *A63F 13/327* (2014.09); *A63F 13/54* (2014.09); *G06F 3/011* (2013.01); *G06F 3/016* (2013.01); *G06F 3/017* (2013.01); *G06F 3/165* (2013.01); *H04B 1/385* (2013.01); *H04L 65/80* (2013.01); *A63F 13/215* (2014.09); *G06F 2203/013* (2013.01); *G10L 21/16* (2013.01)

(58) Field of Classification Search
CPC .......... A63F 13/00; G06F 3/011; G06F 3/016; G06F 3/017; G06F 3/165; H04B 1/385
USPC ........................................................ 709/231
See application file for complete search history.

(56) References Cited

U.S. PATENT DOCUMENTS

| | | | |
|---|---|---|---|
| 9,576,445 B2 | 2/2017 | Cruz-Hernandez et al. | |
| 2003/0028658 A1* | 2/2003 | Bullman | H04L 12/40013 |
| | | | 709/230 |
| 2005/0204057 A1 | 9/2005 | Anderson et al. | |
| 2008/0012701 A1 | 1/2008 | Kass et al. | |
| 2009/0007458 A1 | 1/2009 | Seiler | |
| 2009/0156266 A1 | 6/2009 | Linjama et al. | |
| 2009/0180646 A1* | 7/2009 | Vulfson | H04R 1/02 |
| | | | 381/151 |
| 2009/0196307 A1 | 8/2009 | Togo | |
| 2010/0041991 A1* | 2/2010 | Roundhill | A61B 34/76 |
| | | | 600/443 |
| 2010/0232627 A1* | 9/2010 | Suzuki | H04S 3/00 |
| | | | 381/119 |
| 2010/0260371 A1* | 10/2010 | Afshar | H04R 7/24 |
| | | | 381/394 |
| 2012/0278070 A1 | 11/2012 | Herve et al. | |
| 2013/0038792 A1* | 2/2013 | Quigley | A61H 19/44 |
| | | | 348/515 |
| 2014/0266644 A1* | 9/2014 | Heubel | G08B 6/00 |
| | | | 340/407.1 |
| 2015/0061846 A1 | 3/2015 | Yliaho | |
| 2015/0070147 A1 | 3/2015 | Cruz-Hernandez et al. | |
| 2016/0261917 A1* | 9/2016 | Trollope | H04N 21/475 |
| 2017/0048485 A1* | 2/2017 | Dewa | H04N 21/4884 |
| 2017/0169673 A1* | 6/2017 | Billington | H04W 4/20 |
| 2018/0060022 A1* | 3/2018 | Kozlov | G06F 3/165 |
| 2018/0262792 A1* | 9/2018 | Mackay | H04N 21/4305 |
| 2018/0367898 A1* | 12/2018 | Alrawi | H04R 3/12 |

FOREIGN PATENT DOCUMENTS

| | | |
|---|---|---|
| JP | 2013541264 A | 11/2013 |
| JP | 2014179984 A | 9/2014 |
| WO | WO 2018/053159 A1 | 3/2018 |

OTHER PUBLICATIONS

The United States Patent and Trademark Office, International Search Report in International Application No. PCT/US2017/051607 (dated Dec. 28, 2017).

The United States Patent and Trademark Office, Written Opinion of the International Searching Authority in International Application No. PCT/US2017/051607 (dated Dec. 28, 2017).

Office Action for Japanese Office Action 515466/2019 dated Aug. 3, 2021 (4 pages).

* cited by examiner

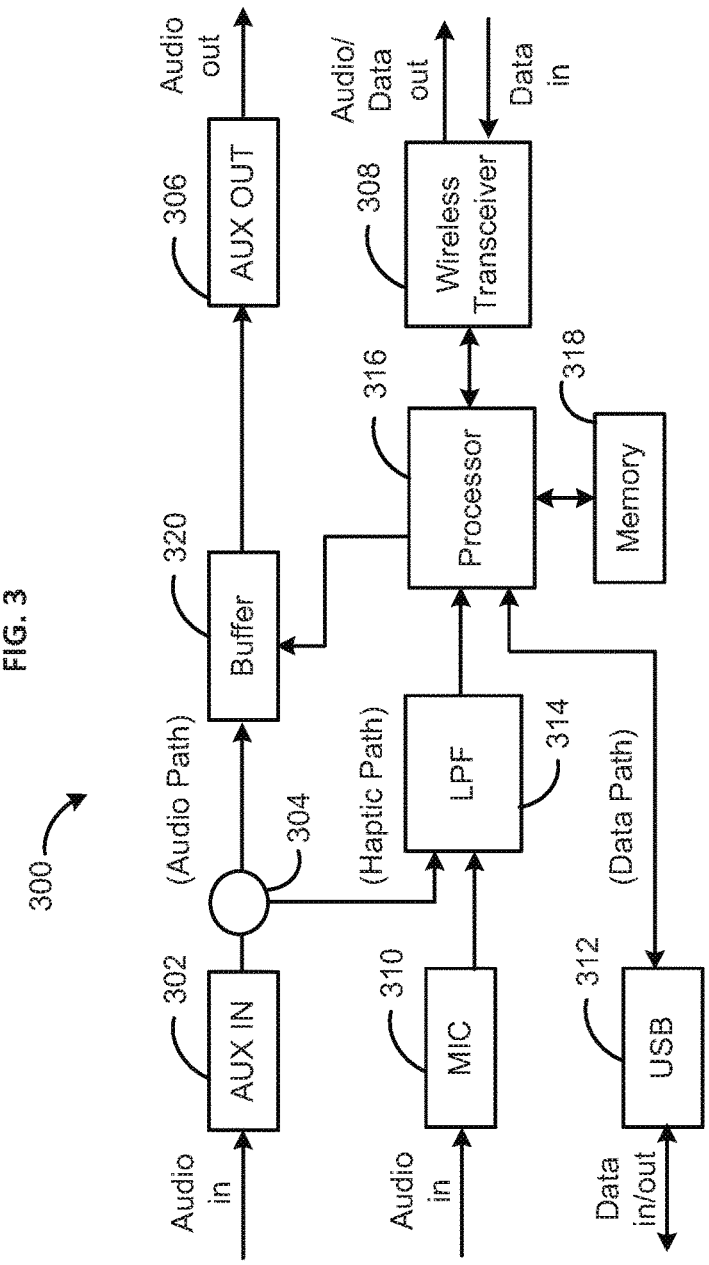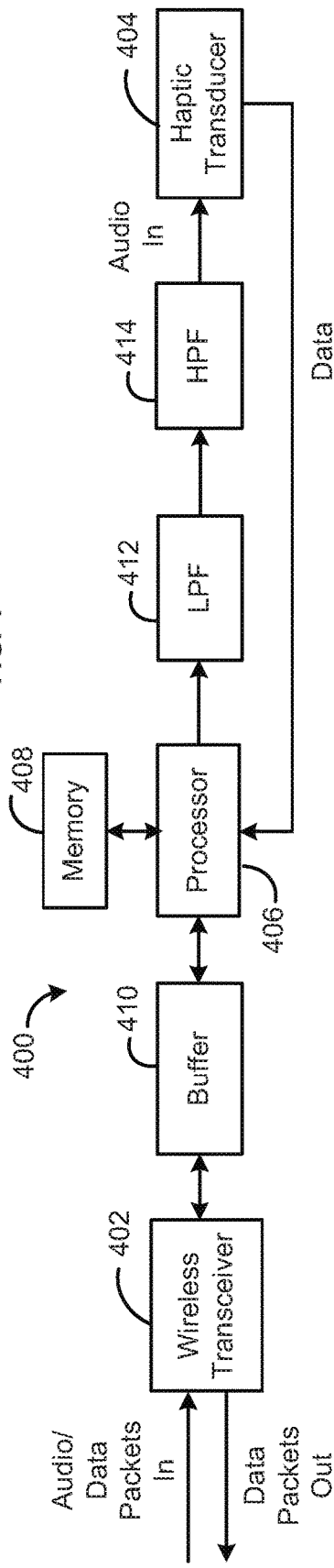

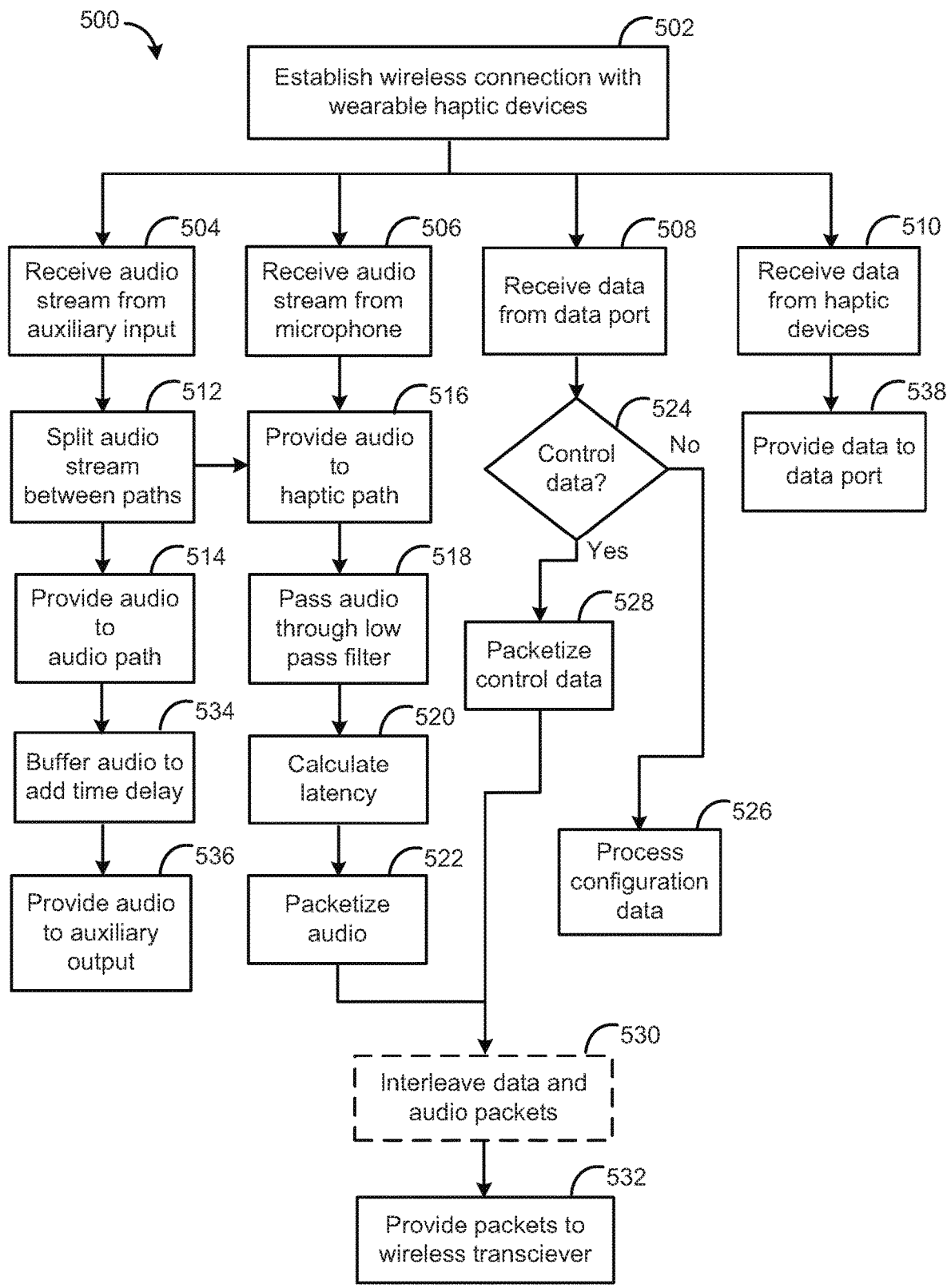

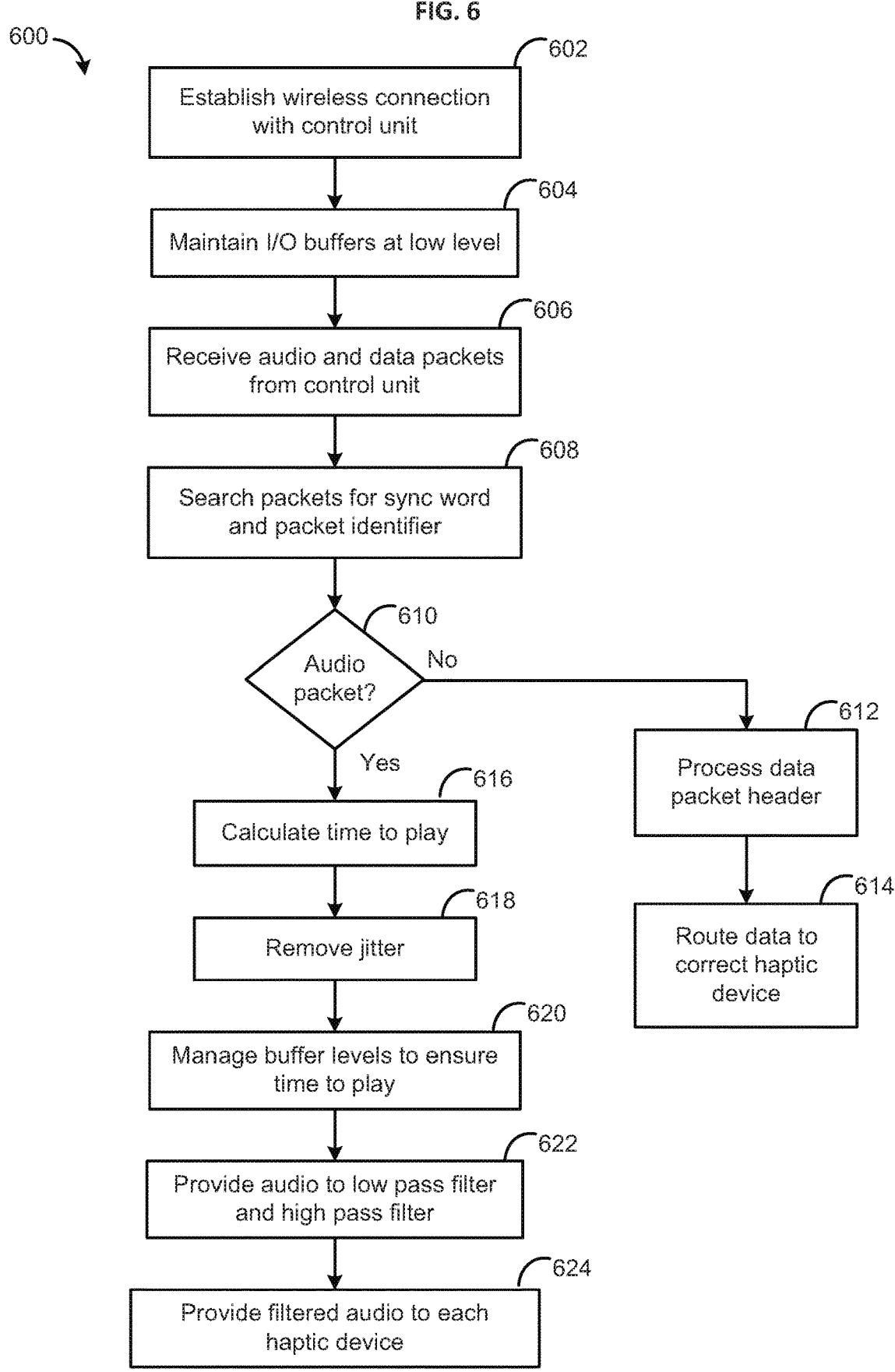

MULTI-DEVICE AUDIO STREAMING SYSTEM WITH SYNCHRONIZATION

CROSS-REFERENCE TO RELATED APPLICATION

This application claims priority to U.S. Provisional Application No. 62/394,707, which was filed on Sep. 14, 2016 and is incorporated by reference herein in its entirety.

BACKGROUND

Consumers of multi-media entertainment are seeking methods of heightened multi-sensory immersion. Existing systems for providing audio immersion include use of a subwoofer to feel the low tones of music and to improve the audio of a motion picture or a video game, and the use of surround sound to immerse the user in a more entertaining experience. However, aside from audio content, these methods do not provide a multi-sensory stimulation while in a virtual reality or other audio-visual scenario. Moreover, sub-woofers, in particular, are not convenient for users that prefer experiencing multi-media entertainment while "on the go," as the physical size of sub-woofer devices prevent portability. At the same time, existing portable devices, such as conventional earphones, are not capable of providing the same low frequency effect as sub-woofers.

The addition of tactile or haptic stimulation to existing systems for audio and/or audio-visual immersion can provide multi-sensory immersion and make an entertainment experience even more enjoyable. For example, vibrations generated based on audio signals for a musical piece can be synchronized with the audio signals to provide an enhanced musical experience where the user both hears and feels the music. Some existing haptic devices are separate from the audio/visual output devices and therefore, require separate components to produce synchronized operation with the rest of the multi-media experience. For example, haptic stimulation may be provided through wearable haptic devices that are connected to the audio or audio-visual system via a wired or wireless connection. In some cases, a wireless connection may be preferred so that the user can experience multi-sensory immersion while on the go or from any location. One solution embeds the haptic devices inside footwear, such as, for example, shoes or an insole designed to be placed inside existing shoes, and uses a short-range wireless communication technology (such as, e.g., Bluetooth®) to transmit audio signals to and/or between the haptic devices.

However, existing techniques for streaming audio from an audio system to a peripheral device via wireless communications have several known drawbacks. For example, some existing audio streaming techniques have latency issues that are severe enough to cause a perceivable delay between the audio and video components of the entertainment experience. As a result, the addition of haptic stimulation to such scenarios can result in a perceivable delay between the audio and haptic components of the entertainment experience.

Accordingly, there is still a need in the art for an improved multi-sensory system that can wirelessly deliver haptic content in synchrony with associated audio content, so as to provide a personal, multi-sensory experience while in a virtual reality, surround sound, or other audio-visual scenario.

SUMMARY

The invention is intended to solve the above-noted problems by providing systems and methods that are designed, among other things, to provide a low latency wireless connection between multiple devices, such that delivery of audio content is synchronized with delivery of related haptic content during a multi-sensory entertainment experience.

For example, one embodiment includes an electronic control unit comprising an audio input device for receiving an audio stream from an external audio source and a signal splitter coupled to the audio input device for splitting the audio stream between an audio path and a haptic path; a wireless transceiver coupled to the haptic path for transmitting the audio stream to at least one wearable haptic device using short-range wireless communication technology. In addition, the electronic control unit includes a processor coupled to the wireless transceiver and configured to calculate an amount of latency associated with the transmission of the audio stream to the at least one wearable haptic device, and partition the audio stream into a plurality of audio packets, each audio packet including a time-to-play based on the calculated amount of latency. The electronic control unit further includes a buffer included in the audio path for inserting a time delay into the audio stream provided to the audio path, the time delay being based on the calculated amount of latency, and an audio output device coupled to the audio path for outputting the time-delayed audio stream to an external audio listening device.

Another example embodiment includes an entertainment system comprising an electronic control unit and at least one wearable haptic device configured to convert an audio stream into haptic signals. The electronic control unit includes an audio input device for receiving the audio stream from an external audio source, an audio output device for outputting the audio stream to an external audio listening device, and a wireless transceiver for transmitting the audio stream to the at least one wearable haptic device using short-range wireless communication technology. The electronic control unit also includes a processor configured to synchronize delivery of the haptic signals with delivery of the time-delayed audio stream by calculating an amount of latency associated with the wireless transmission of the audio stream to the at least one wearable haptic device, partitioning the audio stream into a plurality of audio packets, each audio packet including a time-to-play based on the calculated amount of latency, and inserting a time delay into the audio stream provided to the audio listening device, the time delay being based on the calculated amount of latency.

Another example embodiment includes a method of synchronizing delivery of an audio stream with delivery of haptic signals derived from the audio stream. The method includes establishing a wireless connection with at least one wearable haptic device using a wireless transceiver configured for short-range wireless communications; receiving an audio stream from an external audio source via an audio input device; splitting the audio stream between an audio path comprising a buffer and an audio output device and a haptic path coupled to the wireless transceiver and a processor; calculating, using the processor, an amount of latency associated with transmission of the audio stream by the wireless transceiver to the at least one wearable haptic device; partitioning, using the processor, the audio stream of the haptic path into a plurality of audio packets, each audio packet including a time-to-play based on the calculated amount of latency; inserting, using the buffer, a time delay into the audio stream of the audio path, the time delay being based on the calculated amount of latency; providing the time-delayed audio stream to the audio output device for delivery to an external audio listening device coupled to the audio output device; and transmitting, via the wireless transceiver, the plurality of audio packets to the at least one wearable haptic device.

Yet another example embodiment includes a method comprising establishing a wireless connection with an electronic control unit using a wireless transceiver configured for short-range wireless communications; receiving, via the wireless transceiver, a plurality of audio packets from the electronic control unit; for each audio packet, retrieving, using a processor, a time-to-play data included in the audio packet; retrieving, from an internal clock, a current play time; calculating a new time-to-play value for each audio packet based on the time-to-play data included in the audio packet and the current play time; and providing each audio packet to one or more haptic transducers for converting the audio packet into a haptic signal, the haptic signal being output by the one or more haptic transducers in accordance with the corresponding new time-to-play value.

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

FIG. 3 is a block diagram of an exemplary electronic control unit included in the entertainment system of FIG. 1 in accordance with embodiments.

FIG. 4 is a block diagram of an exemplary haptic device included in the entertainment system of FIG. 1 in accordance with embodiments.

FIG. 5 is a flow diagram of an example method of synchronizing delivery of an audio stream with delivery of haptic signals derived from the audio stream in accordance with embodiments.

FIG. 6 is a flow diagram of another exemplary method in accordance with embodiments.

DETAILED DESCRIPTION OF EXAMPLE EMBODIMENTS

Figure 1:
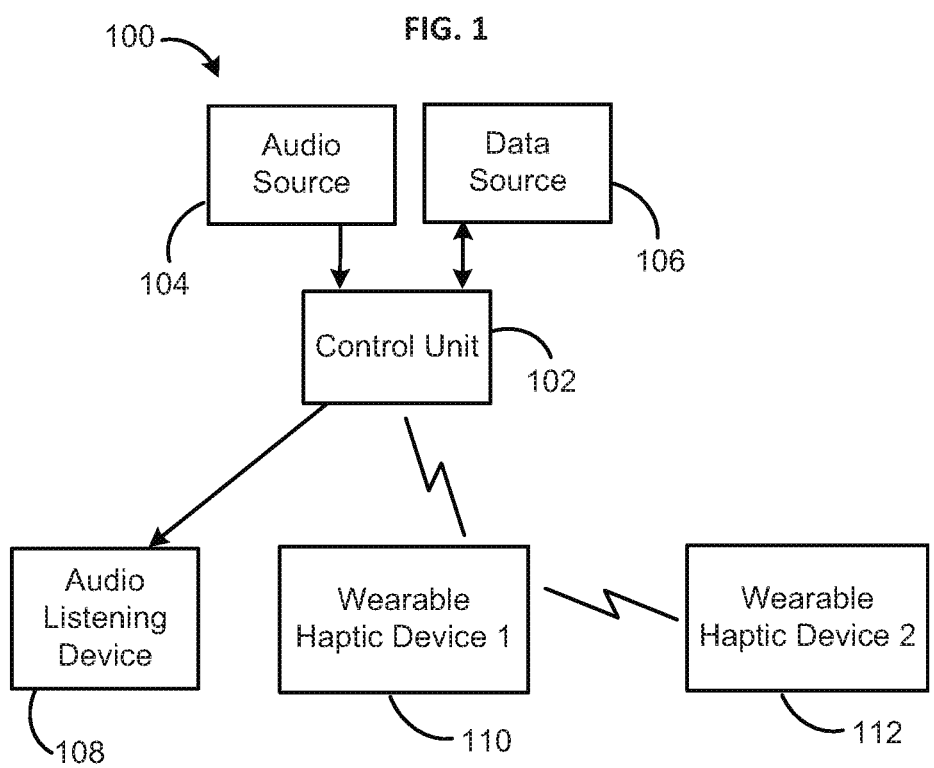
FIG. 1 is a block diagram of an exemplary entertainment system in accordance with embodiments.

While the invention may be embodied in various forms, the Figures show and this Specification describes some exemplary and non-limiting embodiments, with the understanding that the present disclosure is to be considered an exemplification of the invention and is not intended to limit the invention to the specific embodiments illustrated. Also, not all of the depicted or described components may be required, and some embodiments may include additional, different, or fewer components. The arrangement and type of the components may vary without departing from the spirit or scope of the claims set forth herein.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects Various embodiments provide an electronic control unit that is wirelessly coupled to one or more wearable haptic devices and is communicatively coupled to an audio source (such as, e.g., a media player) and an audio listening device (such as, e.g., headphones) in order to provide personal multi-sensory immersion for a user. For example, the wearable haptic device(s) may dramatically improve the experience of listening to music, watching a movie, playing a video game, or other audio or audio-visual scenario. The wearable device(s) can include a haptic transducer configured to impart a vibration based on an audio stream received from the audio source. In some embodiments, the electronic control unit is wirelessly coupled to a pair of footwear devices, each comprising a haptic transducer for enhancing the entertainment experience. The footwear device may be a piece of footwear (e.g., a shoe) or an insole for placement in the bottom of footwear. Placing the haptic transducer into footwear can expand the entertainment experience outside the confines of the head to involve the body, or at least a foot of the user, in an immersive, tactile, and portable experience. In order to preserve the portability of the multi-sensory entertainment experience, the pair of footwear devices can wirelessly communicate with each other, as well as with the electronic control unit, for example, using a Bluetooth communications protocol.

In embodiments, a low latency wireless connection, or communication channel, is established between the electronic control unit and the wearable haptic devices in order to deliver the audio content (e.g., via the audio listening device) in synchrony with the haptic content (e.g., via the footwear devices). This synchrony is accomplished, at least in part, by buffering or otherwise delaying delivery of the audio content by an amount of time that matches an amount of latency present in the wireless connection between the electronic control unit and the wearable haptic devices, and in some cases, the wireless connection between the wearable haptic devices themselves, as well as the latency caused by data processing times at the electronic control unit and the haptic devices. Moreover, the electronic control unit can be configured to partition the audio content into audio packets prior to transmitting the audio content to the wearable haptic devices and to assign a time to play value to each audio packet based on the this amount of latency. In some embodiments, data packets may also be exchanged over the wireless connection between the electronic control unit and the wearable haptic devices. To maintain the low latency aspect of the connection, the wearable haptic devices can be configured to keep input buffer levels low, so that both audio and data packets move quickly through the queue. In addition, the wearable haptic devices can be configured to buffer or otherwise adjust the time to play value for each audio packet based on a current play time on an internal clock of the wearable haptic device, so as to reduce packet loss and preserve the integrity of the wireless connection.

Bluetooth® technology is commonly used for many wireless applications between portable and computing devices and the like. For example, it is increasingly being used in domestic applications for functions such as streaming or playing back audio and/or video data and other multi-media applications such as gaming using portable gaming devices. Thus, various embodiments described herein refer to operation in accordance with Bluetooth. However, the general principles described herein can be applied to devices and systems operating according to other wireless communications protocols, such as, for example, Wi-Fi, Zigbee, etc.

FIG. 1 illustrates an exemplary entertainment system 100 configured to synchronize delivery of audio content to a user with delivery of haptic content, as perceived by the user, in accordance with embodiments. As shown, the system 100 includes an electronic control unit 102 (also referred to herein as "control unit") communicatively coupled to an audio source 104 and a data source 106 for receiving audio and data inputs, respectively. The control unit 102 may be a computing device, controller, or any other type of electronic device capable of interfacing with the audio source 104, data source 106, and the other components of the system 100 and processing the data received therefrom in order to implement the techniques described herein. The audio input may be an audio stream that either constitutes standalone audio content, such as, for example, a musical piece, or is part of audio-visual content, such as, for example, a video game, a movie, or other video-based application. The data input may be control data for controlling operation of the control unit 102 and/or a device communicatively coupled thereto (e.g., wearable haptic devices 110 and 112).

The audio source 104 may be any type of electronic device capable of providing audio content to the control unit 102, including, for example, an audio device (e.g., a stereo system, surround sound system, radio, audio receiver, etc.), a personal media player (e.g., MP3 player) or any other type of media player (e.g., a DVD or Blue-ray player), a mobile communication device (e.g., a smart phone or portable telephone) or any other type of mobile computing device (e.g., a tablet or PDA), a personal computer (e.g., laptop or desktop), and/or a video gaming device (e.g., a gaming console, video game controller, or handheld gaming device). The data source 106 may be any type of electronic device capable of providing data content to the control unit 102, including, for example, a video gaming device, a personal computer, a mobile communication device or other mobile computing device, and/or a personal media player. Though FIG. 1 shows a single audio source 104 and a single data source 106, in other embodiments, the entertainment system 100 may include multiple audio sources and/or data sources.

In embodiments, each of the audio source 104 and the data source 106 may be communicatively coupled to the electronic control unit 102 via a wired or wireless connection. In some embodiments, the control unit 102 includes one or more wireless transceivers and other wireless communication circuitry for creating a wireless connection with the audio source 104 and/or the data source 106. In other embodiments, the control unit 102 includes an audio input device (such as, e.g., audio input device 302 shown in FIG. 3) for receiving audio content from the audio source 104 and a data port (such as, e.g., data port 314 shown in FIG. 3) for receiving data content from the data source 104. In some cases, the data source 106 and the audio source 104 may be a common electronic device that provides both audio and data content to the control unit 102. In such cases, the common electronic device may be communicatively coupled to both the audio input device and the data port of the control unit 102. Alternatively, the common electronic device may be communicatively coupled to a single input device of the control unit 102 (such as, e.g., the data port) for providing both audio and data content thereto.

As illustrated, the system 100 also includes an audio listening device 108 communicatively coupled to the control unit 102, via a wired or wireless connection, for audibly outputting or playing the audio content provided by the audio source 104. In some embodiments, the audio listening device 108 is coupled to an audio output device of the control unit 102 (such as, e.g., audio output device 308 shown in FIG. 3). The audio listening device 108 can be any type of audio playback device, including, for example, headphones, earphones, headsets, or loudspeakers.

In addition, the system 100 can include a first wearable haptic device 110 and a second wearable haptic device 112 for converting the audio content provided by the audio source 104 into haptic signals and applying vibrations or tactile sensations generated by these haptic signals to the wearer's body. For example, the vibrations or tactile sensations may be perceived or felt by a user when the wearable haptic devices 110 and 112 are placed in close proximity to, or worn by, the user. In some embodiments, the wearable haptic devices 110 and 112 can be integrated into a single wearable piece, such as, for example, a shirt, a vest, a belt, pants, or other piece of clothing having multiple haptic devices integrated into different areas of the piece. In other embodiments, each of the wearable haptic devices 110, 112 can be embodied as a separate wearable piece, such as, for example, a piece of footwear (e.g., a shoe, a sock, or an insole designed to be placed inside a shoe or sock), a glove, an armband, a wristband or bracelet, an ankle band or anklet, etc. While two devices 110 and 112 are shown in FIG. 1, in other embodiments, the system 100 may include more or less than two wearable haptic devices 110 and 112.

Figure 2:
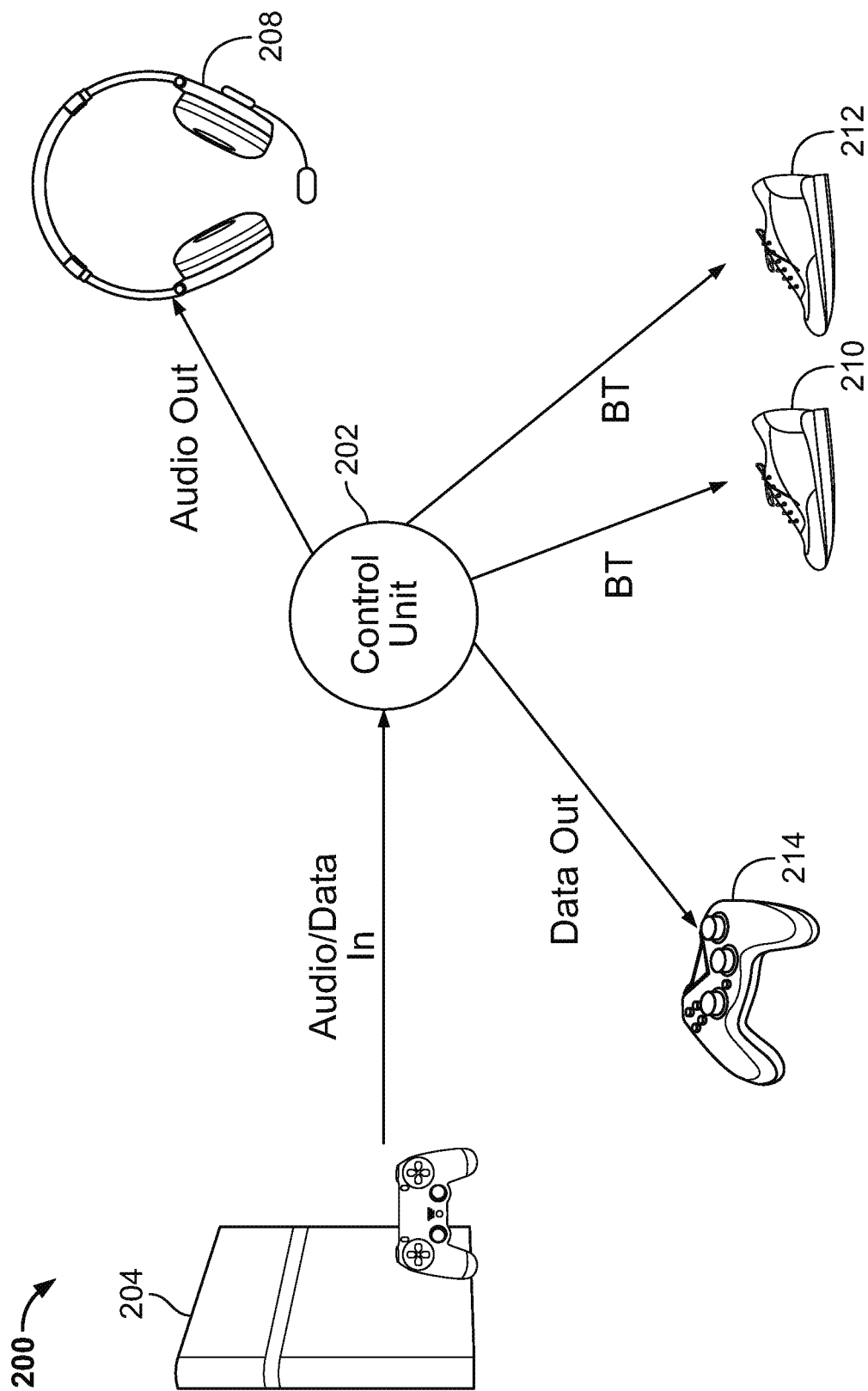
FIG. 2 illustrates an exemplary implementation of the entertainment system of FIG. 1 in accordance with embodiments.

In embodiments, the wearable haptic devices 110 and 112 can be configured to be in wireless communication with the control unit 102. As shown in FIG. 1, in some embodiments, only one of the devices, such as, for example, the first wearable haptic device 110, is in wireless communication with the control unit 102, while the second wearable haptic device 112 communicates with the control unit 102 through the first wearable haptic device 110. In such cases, the first and second wearable haptic devices 110 and 112 may also communicate with each other via a wireless connection. In other embodiments, each of the haptic devices 110 and 112 has an independent wireless connection to the control unit 102 (for example, as shown in FIG. 2). In preferred embodiments, the haptic devices 110 and 112 communicate with each other and/or the control unit 102 using short-range wireless communication, such as, for example, a Bluetooth communications protocol.

In some embodiments, the entertainment system 100 can be further configured to provide multi-sensory immersion for a live or real-time entertainment experience, such as, for example, at a concert, in a movie theater, or using a surround sound system at home. In such embodiments, the live or real-time entertainment experience may serve as the audio source 104 of the entertainment system 100, rather than an electronic device coupled to the control unit 102. In addition, one of the audio input devices included in the control unit 102 may be a microphone (such as, e.g., audio input device 312 shown in FIG. 3) that is configured to capture the live or real-time sounds and convert the sounds into an electrical signal. The electrical signals generated by the microphone can be provided as an audio input to the control unit 102, and the control unit 102 can be configured to provide this audio input to the wearable haptic devices 110 and 112 for generating a haptic signal based thereon. In this manner, haptic content can be added to the audio or audio-visual content of a live or real-time entertainment experience.

In some embodiments, the wearable haptic devices 110 and 112 can be further configured to detect a movement or gesture of the user and provide data representing the detected movement to the control unit 102 for conveyance to the data source 106. For example, when used with a gaming console or video game controller, the wearable haptic devices 110 and 112 may operate as input devices for the gaming console, and the detected gestures or movements of the user may serve as inputs in a video game. In some cases, the detected movement data may be packetized and sent back to the control unit 102 using the wireless connection between the control unit 102 and the haptic devices 110 and 112. In situations like these and others where the haptic devices 110 and 112 collect data for the control unit 102 and/or the data source 106, the wireless connection between the control unit 102 and the haptic devices 110 and 112 can be configured as a bi-directional connection for both sending and receiving packets.

The control unit 102 can be any type of electronic computing device capable of processing the audio content provided by the audio source 104 and the data content provided by the data source 106, packetizing the audio and data content into audio and data packets, respectively, that are suitable for wireless transmission to the wearable haptic devices 110 and 112, and synchronizing delivery of the haptic content output from the haptic devices 110 and 112 with delivery of the audio content output by the audio listening device 108. In embodiments, the control unit 102 can be a hardware accessory that is sold with the wearable haptic devices 110 and 112 for implementing the entertainment system 100. For example, the control unit 102 may be packaged as a dongle, puck, or other small electronic device with appropriate input and output devices and a wireless transceiver (such as, e.g., wireless transceiver 310 shown in FIG. 3) that is compatible with the wireless transceivers of the haptic devices 110 and 112 (such as, e.g., wireless transceiver 402 shown in FIG. 4).

FIG. 2 illustrates an exemplary implementation of the entertainment system 100 for use in a video gaming scenario, in accordance with embodiments. As shown, an entertainment system 200 can include a control unit 202 configured to receive audio content from a gaming console 204 serving as an audio source of the system 200. As will be appreciated, the gaming console 204 may also be connected to a display screen (not shown) for displaying video content in association with the audio content. The control unit 202 can provide the received audio content to headphones 208 for delivery to the user's ears. As also shown, the control unit 202 can be wirelessly coupled, via a Bluetooth communications protocol, to a pair of footwear devices 210 and 212 configured to convey vibrations based on the audio content to the user's feet. For example, each of the footwear devices 210 and 212 can include a haptic transducer (such as, e.g., haptic transducer 404 shown in FIG. 4) for converting the audio content received from the control unit 202 into haptic signals for enhancing the entertainment experience (e.g., a video game, a movie, a musical piece, etc.) provided by the system 200. In embodiments, the footwear devices 210 and 212 can be similar to the vibrating footwear device described in co-owned U.S. Pat. No. 8,644,967, the contents of which are incorporated by reference herein in its entirety.

In the illustrated embodiment, a game controller 214 (e.g., a handheld gaming device) is communicatively coupled to the control unit 202 for receiving data content from the footwear devices 210 and 212. For example, the haptic transducers within the devices 210 and 212 can be configured to detect a movement of the user wearing the devices 210 and 212 and/or gather information related to the movements of the user, such as, for example, number of steps, type of movement (e.g., running/jogging, walking, dancing, etc.), distance traveled, direction of travel, speed, ground characteristics (e.g., type of terrain or flooring), etc. This movement or positional data may be sent back to the control unit 202 via a wired or wireless connection between the control unit 202 and the footwear devices 210 and 212. And the control unit 202 may transmit the received data to the game controller 214 via a wired or wireless connection. In some cases, the data received from the footwear devices 210 and 212 may serve as inputs to a video game and therefore, may be provided by the game controller 214 to the gaming console 204 for processing in relation to a video game being played by the user. In such cases, the gaming controller 214 and the gaming console 204 may be components of the same gaming system.

In some cases, the gaming console 204 serves as both an audio source and a data source for the entertainment system 200, and provides data to the control unit 102 for controlling or configuring the footwear devices 210 and 212. In such cases, the control unit 202 can transmit the data content along with the audio content to the footwear devices 210 and 212. The data content may include instructions regarding specific tactile sensations or vibrations to impart to the user through the footwear devices 210 and 212 (e.g., an earthquake, an engine rumbling, tires on a gravel road, etc.). In some cases, the data content indicates whether the audio content is intended for the first footwear device 210, the second footwear device 212, or both devices. The data content may also indicate what data should be captured by the haptic transducers included in the devices 210 and 212 and sent back to the game controller 214 via the control unit 202.

In the illustrated embodiment, the control unit 202 has a separate Bluetooth connection with each of the footwear devices 210 and 212 and therefore, can wirelessly transmit the audio and/or data content to both devices 210 and 212 at once. In other embodiments, the control unit 202 may be configured to wirelessly transmit the audio and/or data content to only one of the two footwear devices 210 and 212 (for example, as shown in FIG. 1), and the receiving device 210/212 can be configured to forward the received content to the other device 212/210.

As shown in FIG. 2, the control unit 202 can be implemented as a dongle-type device that hangs between or from the cables used to attach the control unit 202 to the gaming console 204 and the headphones 208. In some embodiments, the control unit 202 can be configured for placement on the user's person (e.g., worn as a bracelet or necklace), attachment to the user's clothing (e.g., using Velcro or clips), or placement in another close location (e.g., in a pocket, purse or bag).

In conventional wireless systems, latency, or the delay between when a signal enters the wireless system and when it emerges from the system, is generally low (usually measured in milliseconds (ms)), but in certain entertainment applications, even a small delay may be perceived by the user and/or alter the user experience. For example, when using wireless headphones in an audio-visual scenario, the audio latency resulting from wireless transmission of an audio signal to the wireless headphones may be high enough (such as, e.g., over 200 ms) to cause a user-perceivable delay between the audio delivered to the user via the headphones and the video appearing on a display screen (e.g., offset lip synching). As will be appreciated, a certain amount of latency may be inherent to any given wireless connection, for example, due to the speed of sound in air, propagation delay, and any obstacles affecting the wireless signal path. However, other sources of latency may be unique to, or dependent on, a given wireless system, such as, for example, packet transmission and/or delivery time, buffering, digital signal processing, and analog-to-digital and/or digital-to-analog conversions.

In order to provide multi-sensory immersion or otherwise enhance an audio or audio-visual experience using haptic content, the haptic content needs to be delivered to the user in synchrony with at least the audio content from which the haptic content is derived. Thus, in the context of the present disclosure, the term "latency" may refer to the delay between when an audio signal enters the control unit 102 and when a related haptic signal emerges from the wearable haptic devices 110 and 112, wherein at least a portion of the delay is caused by or related to the wireless connection between the control unit 102 and the wearable haptic devices 110 and 112. Various embodiments described herein provide an ultra-low latency wireless connection between the control unit 102 and the wearable haptic devices 110 and 112, so as to essentially remove any user-perceivable delay when implementing the entertainment system 100. For example, each of the control unit 102 and the wearable haptic devices 110 and 112 can be configured to process incoming and outgoing data (e.g., audio streams, control data, audio packets, data packets, etc.) in a manner that reduces the latency of the wireless connection to less than 50 milliseconds, and in some cases, only 40 milliseconds.

FIG. 3 illustrates an exemplary electronic control unit 300 configured to facilitate an ultra-low latency wireless connection between the electronic control unit 300 and one or more haptic devices (such as, e.g., the wearable haptic devices 110 and 112 shown in FIG. 1), in accordance with embodiments. The electronic control unit 300 may be substantially similar to the control unit 102 shown in FIG. 1 and described herein, and/or the control unit 202 shown in FIG. 2 and described herein. In embodiments, the control unit 300 can be implemented on one or more integrated circuits.

As shown in FIG. 3, the control unit 300 includes an audio input device 302, such as, e.g., an auxiliary input, that is configured to receive an audio stream from an external audio source (such as, e.g., the audio source 104 shown in FIG. 1). For example, the audio input device 302 may be an audio socket (e.g., a 3.5 millimeter audio socket) configured to receive a corresponding audio plug (e.g., a 3.5 millimeter audio jack) coupled to the audio source via a cable. In embodiments, the audio input device 302 can be coupled to an audio splitter 304 configured to split the input audio or audio stream between an audio path within the control unit 300 and a haptic path within the control unit 300. The audio splitter 304 may be implemented in hardware (e.g., using on-board circuitry components), software (e.g., executed by a processor of the control unit 300), or a combination thereof.

As shown, the audio path within the control unit 300 may be coupled to an audio output device 306, such as, e.g., an auxiliary output, that is configured to output the audio stream provided to the audio path to an external audio listening device (such as, e.g., the audio listening device 108 shown in FIG. 1). For example, the audio output device 306 may be an audio socket configured to receive a corresponding audio plug coupled to the audio listening device via a cable.

As also shown, the haptic path within the control unit 300 may be coupled to a wireless transceiver 308 that is configured to transmit the audio stream provided to the haptic path to one or more external haptic devices (such as, e.g., the wearable haptic devices 110 and 112 shown in FIG. 1, and/or haptic device 400 shown in FIG. 4) using short-range wireless communications technology. For example, the wireless transceiver 308 may be a Bluetooth transceiver that has been paired with the haptic devices to allow wireless communication therebetween.

In some embodiments, the control unit 300 further includes a second audio input device 310, such as, for example, a microphone, that is configured to capture sounds within a predetermined proximity of the control unit 300 and convert the captured sounds into an audio signal. As shown in FIG. 3, the second audio input device 310 can be coupled to the haptic path, so as to provide the captured audio signal to the wireless transceiver 308 for transmission to the external haptic devices. In such cases, the audio source for the control unit 300 may be a live or real-time entertainment event, such as, for example, a movie playing in a movie theater, a concert in a concert hall, or a video game presented through a surround sound system, and the control unit 300 can be used to enhance the live or real-time entertainment experience with haptic content that is derived from the audio content captured by the microphone 310 during the entertainment experience. For example, the control unit 300 may enable the user to experience vibrations designed to enhance the low frequency components of the live or real-time audio content.

As shown in FIG. 3, the control unit 300 can further include a data input device 312 (also referred to herein as a "data port") coupled to a data path included in the control unit 300 for receiving data from an external data source communicatively coupled to the data input device 312. In some embodiments, the data port 312 is also configured as a data output device to provide data received from the wireless transceiver 308 to the data source coupled to the data port 312. In such cases, the data path may be capable of bi-directional transmissions. The data input device 312 may be any type of data port, such as, for example, a universal serial bus (USB) port, a mini-USB port, a micro-USB port, a Lightening connector port, an Ethernet port, etc. In some embodiments, the data input device 312 can also be used to receive a charging cable for re-charging a battery (not shown) of the control unit 300.

As shown in FIG. 3, the haptic path further includes a low pass filter (LPF) 314 for removing high frequency components from the audio stream provided to the haptic path, either by the first audio input device 302 or by the second audio input device 310. The exact cut off value for the LPF 314 may be selected based on the low frequency effect desired from the external haptic devices. For example, in some embodiments, the LPF 314 may be configured to filter out frequencies at or above 600 Hz because the external haptic devices are configured to enhance frequency components below 600 Hz. As shown, the LPF 314 can be placed near the beginning of the haptic path, so that the high frequency components are removed before the audio stream reaches a processor 316 coupled to the haptic path and the wireless transceiver 308 coupled to the end of the haptic path. This placement of the LPF 314 can help reduce the size of the audio stream prior to processing and transmission, which can help lower the latency associated with processing data within the control unit 300 and/or the wireless connection between the control unit 300 and the external haptic devices.

The processor 316 can include one or more of a baseband processor, an audio processor, a data processor, a central processing unit, a microprocessor, a microcontroller, a programmable logic array, an application-specific integrated circuit, a logic device, or other electronic device for processing, inputting, outputting, manipulating, storing, or retrieving data. The processor 316 can be configured to execute software stored in a memory 318 of the control unit 300. The memory 318 can comprise one or more of a data storage device, an electronic memory, a nonvolatile random access memory (e.g., RAM), flip-flops, a non-transitory computer-writable or computer-readable storage medium, a magnetic or optical data storage device, or other electronic device for storing, retrieving, reading, or writing data. The memory 318 can store one or more computer program modules, computer executable instructions, or other software for execution by the processor 316. For example, in embodiments, the memory 318 may store a software application (not shown), which, when executed by the processor 316, causes the processor 316 to implement the low latency wireless communication protocol described herein, facilitate synchronization of audio and haptic content delivery using the control unit 300, and/or implement a method described herein (such as, for example, method 500 shown in FIG. 5).

As shown, the processor 316 can be coupled to the haptic path between the low pass filter 314 and the wireless transceiver 308, so that the filtered audio stream can be processed before the audio content is transmitted to the external haptic devices. According to embodiments, the processor 316 can be configured to packetize the filtered audio stream by partitioning the audio content into a plurality of audio packets. As shown in FIG. 3, the processor 316 is also coupled to the data path for receiving data inputs from the data port 312, such as, for example, control data for controlling operation of the external haptic devices. In embodiments, the processor 316 can be configured to packetize the data inputs received via the data port 312 and provide the data packets to the wireless transceiver 308 for transmission to the external haptic devices along with the plurality of audio packets.

In some cases, the data packets include control data for controlling functions associated with the play back of audio content, such as, for example, pausing, playing, volume control, etc. Alternatively or additionally, the data packets can include control data specifically for the external haptic devices, such as, for example, instructions to simulate an earthquake, walking, a tank rumbling, or other tactile sensations associated with the audio content.

The processor 316 can be configured to interleave the data packets into the plurality of audio packets before providing the packets to the wireless transceiver 308, so that the audio and data packets are transmitted over the same communications channel. Transmitting both types of packets at once may reduce transmission time and allow the external haptic devices to process the data packets and the audio packets in quick succession and/or more efficiently, thus helping reduce the amount of latency present in the wireless connection between the control unit 300 and the external haptic devices.

In embodiments, each audio packet can be assigned an audio packet identifier, a sync word, and time-to-play (TTP) data, all of which may be included in the header of the audio packet. Likewise, each data packet can be assigned a data packet identifier and a sync word, both of which are included in the packet header. The audio packet identifier identifies an audio packet as containing audio content and may be common to all audio packets. Similarly, the data packet identifier identifies a data packet as containing control data and may be common to all data packets. The sync word identifies the audio and data packets as belonging to the same transmission and may be common to all packets transmitted or received by the control unit 102. The TTP data indicates a time at which the audio content within a given audio packet should be played, or the temporal order of the audio packet within the audio stream, and therefore, may be unique to each audio packet. The TTP data can be used to reconstruct the audio stream at the external haptic devices. The header of each audio or data packet can further include source, destination, command, checksum, and payload size information. In addition to the header, each packet can also include a payload or the actual audio or data content being carried by that packet. In one example embodiment, the payload of each packet can be up to 2048 bits. When the packets are reassembled on the receiver side (e.g., at the external haptic devices), the header information can be used to identify the audio packets that belong to the same audio stream, differentiate the audio packets from data packets, and place the audio packets in proper order for re-constructing the audio stream.

In some embodiments, the audio and data packets can be configured according to a simple packet structure protocol that allows for faster packet processing by the control unit 300 and the external haptic devices. In particular, the same packet structure may be used for both transmitting and receiving information, but the meaning or interpretation of the messages may change depending on the recipient (e.g., the control unit 300 versus the external haptic devices). For example, if a packet sent from the control unit 300 to the external haptic devices includes a name command "0x0001" in the command portion of the header, the external haptic devices interpret the message as a command to change the device name to the payload. But if a packet comprising the same name command is sent from the external haptic devices to the control unit 300, the processor 316 interprets the command as a message informing the control unit 300 that the external haptic devices are currently named that payload.

In embodiments, the processor 316 can determine the time-to-play data for each audio packet based on a timestamp associated with the audio packet and an estimated amount of latency (e.g., in milliseconds) associated with transmitting the audio stream to the wearable haptic devices. In such cases, the estimated latency may be used as an offset period for delaying play out of the audio content, and the time to play for a given audio packet may be calculated by adding this offset period to the timestamp of that audio packet, or otherwise modifying the timestamp to reflect the offset delay. The timestamp may include a sequence number for the audio content included therein or other time data for facilitating reassembly of the audio stream upon receipt by the external haptic devices. In some embodiments, the timestamp may represent an absolute time that is derived from an internal clock (not shown) of the processor 316 and/or the control unit 300. For example, the timestamp may be derived from a Bluetooth clock of the wireless transceiver 308 used to transmit audio packets to the external haptic devices.

In embodiments, the processor 316 can use one or more factors to calculate or estimate the amount of latency associated with the wireless connection between the control unit 300 and the external haptic devices. For example, the amount of latency can depend on an amount of time required by the processor 316 to packetize the audio stream into audio packets, an amount of time required by the external haptic devices to process the audio and/or data packets received from the control unit 300, an amount of time required to transmit the audio packets from the control unit 300 to the external haptic devices, an amount of time required to transmit the audio packets from one haptic device to the other, and/or any other factor affecting wireless transmission between the control unit 300 and the external haptic devices. The processor 316 may obtain the information used to calculate this latency from one or more sources, including, for example, the wireless transceiver 308 and the external haptic devices, and/or by testing the wireless connection using known techniques. In some cases, the amount of latency applied to each audio packet may vary depending on certain characteristics of the audio packet, such as, for example, source and/or destination, payload size, etc. For example, an audio packet received at a first haptic device and then forwarded to a second haptic device for processing and/or play back may be associated with higher latency than an audio packet that is received and processed by the first haptic device. Further, an audio packet with a larger payload may be associated with higher latency. In some embodiments, the amount of latency may be a predetermined value calculated prior to operation of the control unit 300. In other embodiments, the amount of latency may be dynamically or adaptively adjusted during operation of the control unit 300 as transmission and/or processing conditions change, and/or to minimize the offset period or delay applied to the audio packets.

As shown in FIG. 3, a buffer 320 can be included in the audio path for inserting a time delay into the audio stream provided to the audio path. This time delay can be based on the latency that is calculated by the processor 316 and used to derive the time-to-play data for each audio packet. That is, the audio stream may be transmitted to the external audio listening device with the same amount of delay that was used to offset the play out times for the audio packets. As a result, a user of the control unit 300 may perceive delivery of audio content, via the external audio listening device, as being synchronized with delivery of haptic content, via the external haptic devices. In some embodiments, the time delay may be provided to the buffer 320 by the processor 316, and the buffer 320 can be configured to insert the time delay into the audio stream. In other embodiments, the processor 316 may be configured to insert the time delay into the audio stream by tuning the buffer 320 accordingly or other otherwise instructing the buffer 320 to do so. The buffer 320 can be a first in, first out (FIFO) buffer or other data store suitable for storing audio content prior to transmission via the audio output device 306.

The wireless transceiver 308 can use a wireless communications protocol to broadcast or transmit the audio and data packets to the external haptic devices. In some embodiments, the wireless transceiver 308 can also receive data packets from the external haptic devices via the wireless communication protocol. In embodiments, the wireless transceiver 308 can be a Bluetooth transceiver, the wireless communication protocol can be a Bluetooth communications protocol, and a wireless connection with the haptic devices can be established using a Logical Link Control and Adaptation Protocol (L2CAP) layer of the Bluetooth communications protocol. In a preferred embodiment, the techniques described herein provide a novel Bluetooth communications protocol that only uses certain base Bluetooth layers, including the L2CAP layer, to establish a connection with the haptic devices and utilizes a unique data channel to reliably deliver audio and data packets to the multiple devices. For example, once an L2CAP link is established between the control unit 300 and the external haptic devices, the wireless transceiver 308 establishes a bi-directional data channel between the control unit 300 and each of the haptic devices for transmitting audio and data packets thereto and for receiving data packets therefrom.

Though not shown, the control unit 300 can further include antennas, modems, and other wireless communication circuitry for carrying out the wireless communications protocol implemented by the wireless transceiver 308. To the extent that the control unit 300 operates according to two or more communication protocols (e.g., another short-range wireless communications protocol or a wide area network communications protocol), the control unit 300 may further include separate wireless communications circuitry for carrying out the additional protocol(s). Alternatively, one or more circuitry components may be shared by two or more communications protocols. While the above describes the use of Bluetooth technology, in other embodiments, the wireless transceiver 308 may implement any other wireless communications technology, such as, for example, WiFi, Zigbee, NFC, etc.

FIG. 4 illustrates an exemplary external haptic device 400 configured to wirelessly receive audio data, for example, from the control unit 300 shown in FIG. 3, and convert the audio data into haptic signals, in accordance with embodiments. The haptic device 400 may be included in at least one of the wearable haptic devices 110 and 112 shown in FIG. 1 and/or at least one of the footwear devices 210 and 212 shown in FIG. 2, so that the haptic signals can be applied to the user's body. The haptic device 400 can be further configured to facilitate delivery of the haptic signals to the user's body in synchrony with delivery of related audio content to the user's ears via, for example, the audio listening device 108 shown in FIG. 1. In embodiments, the haptic device 400 can be implemented on one or more integrated circuits.

As shown, the haptic device 400 includes a wireless transceiver 402 for facilitating a wireless connection between the control unit 300 and the haptic device 400. In embodiments, a bi-directional communications channel can be established between the wireless transceiver 308 of the control unit 300 and the wireless transceiver 402 of the haptic device 400 in order to receive audio and data packets from the control unit 300 and send data packets to the control unit 300. The wireless transceiver 402 can be configured for the same type of wireless communications technology as the wireless transceiver 308 in order to establish this channel. In a preferred embodiment, the wireless transceiver 402 is a Bluetooth transceiver, like the wireless transceiver 308 of the control unit 300, and uses the L2CAP layer of a Bluetooth wireless communications protocol to establish a wireless connection with the control unit 300.

The haptic device 400 further includes at least one haptic transducer 404 for converting the audio content received from the control unit 300 into haptic signals. In some embodiments, the haptic transducer 404 is also configured to detect a movement or gesture of the user and obtain and/or record positional or movement data associated therewith. This data may be sent back to the control unit 300, via the wireless transceiver 402, and provided to a data source coupled to the control unit 300 for processing. In embodiments, the haptic transducer 404 can be similar to the haptic transducer described in co-owned U.S. Provisional Patent Application No. 62/366,581 (which issued as U.S. Pat. No.

10,836,924), the contents of which are incorporated by reference herein in its entirety.

As shown in FIG. 4, the haptic device 400 includes a processor 406 for controlling operation of the haptic device 400 and processing audio and data packets received from the control unit 300. The processor 406 can include one or more of a baseband processor, an audio processor, a data processor, a central processing unit, a microprocessor, a microcontroller, a programmable logic array, an application-specific integrated circuit, a logic device, or other electronic device for processing, inputting, outputting, manipulating, storing, or retrieving data. The processor 406 can be configured to execute software stored in a memory 408 of the haptic device 400.

The memory 408 can comprise one or more of a data storage device, an electronic memory, a nonvolatile random access memory (e.g., RAM), flip-flops, a non-transitory computer-writable or computer-readable storage medium, a magnetic or optical data storage device, or other electronic device for storing, retrieving, reading, or writing data. The memory 408 can store one or more computer program modules, computer executable instructions, or other software for execution by the processor 406. For example, in embodiments, the memory 408 may store a software application (not shown), which, when executed by the processor 406, causes the processor 406 to implement the low latency wireless communication protocol described herein, process incoming and outgoing packets, and/or implement a method described herein (such as, for example, method 600 shown in FIG. 6).

The haptic device 400 can include an input buffer 410, such as, for example, a first in, first out (FIFO) buffer or other data store suitable for storing audio and data packets as they are received from the wireless transceiver 402. The audio packets received via the wireless transceiver 402 may be stored in the buffer 410 in time-to-play order. The TTP of a given packet may additionally serve as a sequence number for that packet. In some embodiments, the haptic device 400 may further include an output buffer (not shown) for storing data packets prior to transmission to the control unit 300. In other embodiments, the buffer 410 can be configured as an input/output buffer that handles both incoming and outgoing packets. The haptic device 400 may also include additional buffers (not shown) for storing audio packets after they have been processed by the processor 406.

In embodiments, to help keep latency due to processing within the haptic device 400 low, the input buffer 410 can be maintained at a low level (e.g., 10 samples) that strikes a balance between preventing the store from being under-run, or going empty, and filling the store so quickly that it adds latency. For example, the input buffer levels may be managed by reading the buffer 410 until the levels drop below a predetermined threshold and then waiting to read the buffer 410 again until the levels exceed the threshold. In the case of an output buffer, on the other hand, the buffer may be maintained at a full or nearly full level so that the data packets are ready to be processed as soon as the time comes, thereby avoiding added latency.

In embodiments, the processor 406 can be configured to extract the sync word and packet identifier from each received packet and based on the identifier, determine whether the packet is an audio packet or a data packet. For data packets, the processor 406 can process the control data included therein and perform operations based thereon, which may include, for example, controlling operations of the haptic transducer 404 in accordance with the received control data or forwarding the data packets to the other haptic device. For audio packets, the processor 406 can extract the play out time or timestamp data and the time-to-play (TTP) data from the audio packet.

The processor 406 can take measures to ensure the TTP of the received audio packets. For example, in some embodiments, the processor 406 may synchronize an internal clock of the haptic device 400 (e.g., a Bluetooth clock) to the internal clock of the control unit 300. In some cases, the processor 406 may calculate a new TTP for each audio packet by adjusting the received TTP data in light of a current play time provided by the internal clock of the haptic device 400. The new TTP may be maintained when processing the received audio packets within the haptic device 400.

In embodiments, the processor 406 can be configured to manage the input levels of the buffer 410 so that the TTP for the received audio packets is ensured. For example, if a given audio packet is corrupted or late, the audio packet may be removed from the buffer 410 and read quickly, so that the buffer 410 is not held up by that packet. As another example, if a given audio packet is played too early, the processor 406 may add silence (e.g., zeroes) to the buffer 410, so that the TTP of the remaining audio packets can be maintained. In some embodiments, a packet loss concealment (PLC) algorithm may be performed instead of adding silence. In such cases, audio content that is similar to what is currently being played may be added to the buffer 410, instead of silence, so that the signal degradation is not perceptible or barely perceptible to the user. For example, the processor 406 may repeat the previous audio packet until a correct audio packet is received at the buffer 410.

As shown in FIG. 4, the haptic device 400 can further include a low pass filter (LPF) 412 and a high pass filter (HPF) 414 for filtering out undesired frequency components from the audio content included in the received audio packets. The filters 412 and 414 can be placed between the processor 406 and the haptic transducer 404, so that the audio content is filtered before being output to the haptic transducer 404 for conversion to haptic data. The limits of the filters 412 and 414 can be configured depending on the impact desired from haptic signals produced by the haptic transducer 404. For example, while vibrations or haptic sensations generated from low frequency components may be better perceived by a user, the effect of very low frequency components may not be as beneficial. Accordingly, in one example embodiment, the LPF 412 may be configured to remove frequencies at or above 450 Hz, while the HPF 414 may be configured to remove frequencies at or below 20 Hz.

FIG. 5 illustrates an example process or method 500 of synchronizing delivery of an audio stream with delivery of haptic signals derived from the audio stream, in accordance with embodiments. The method 500 can be a carried out by a computing device, such as, for example, the electronic control unit 300 shown in FIG. 3. For example, the method 500 may be implemented, at least in part, by a processor of the computing device (e.g., the processor 316 shown in FIG. 3) executing a software application stored in a memory of the computing device (e.g., the memory 318 shown in FIG. 3). Further, to carry out the operations of the method 500, the computing device can interact with one or more other devices communicatively coupled thereto, such as, for example, an external audio source (e.g., the audio source 104 shown in FIG. 1), an external data source (e.g., the data source 106 shown in FIG. 1), an external audio listening device (e.g., the audio listening device 108 shown in FIG. 1), and/or one or more external haptic devices (e.g., the wearable haptic devices 110 and 112 shown in FIG. 1).

In embodiments, the method 500 begins at step 502 by establishing a wireless connection between the electronic control unit and at least one wearable haptic device using a wireless transceiver of the electronic control unit (e.g., the wireless transceiver 308 shown in FIG. 3) that is configured for short-range wireless communications. For example, the wireless transceiver may be a Bluetooth transceiver and may be used to wirelessly pair the electronic control unit with the at least one wearable haptic device and establish an L2CAP link with the at least one wearable haptic device. If, for example, the at least one wearable haptic device includes the footwear devices 210 and 212, the Bluetooth transceiver of the electronic control unit may be paired with each of the footwear devices (e.g., the left shoe and the right shoe).

From step 502, the method 500 may continue to one or more of steps 504, 506, 508, and 510, depending on the source and/or destination of received data. For example, in step 504, an audio stream is received from an auxiliary input (e.g., the first audio input device 302 shown in FIG. 3) coupled to an external audio source. In step 506, an audio stream is received from a microphone (e.g., the second audio input device 310 shown in FIG. 3) for capturing live or real-time audio content. In step 508, data is received from a data port (e.g., data input device 312 shown in FIG. 3) coupled to an external data source. And in step 510, data is received from the at least one wearable haptic device. In some cases, the steps 504, 506, 508, and 510 may occur simultaneously or in near succession and the steps that follow may overlap with each other.

From step 504, the method 500 may continue to step 512, where the audio stream is split between two paths: an audio path comprising a buffer (e.g., the buffer 320 shown in FIG. 3) and an audio output device (e.g., the auxiliary output 306 shown in FIG. 3), and a haptic path coupled to the wireless transceiver and a processor. From step 512, the method 500 continues to step 514, where the audio stream is provided to the audio path and to step 516, where the audio stream is provided to the haptic path.

Continuing down the haptic path first, at step 518, the audio stream is filtered to remove high frequency components (e.g., above 600 Hz) using a low pass filter (e.g., LPF 314 shown in FIG. 3). At step 520, the processor calculates an amount of latency associated with transmission of the audio stream by the wireless transceiver to the at least one wearable haptic device. At step 522, the processor packetizes the audio stream provided to the haptic path by partitioning the audio content into a plurality of audio packets. Each audio packet can comprise time-to-play (TTP) data that is based on the calculated amount of latency and represents the time at which the audio content should be played. For example, the calculated latency can be added to a timestamp associated with the audio packet so that the play time for each audio packet is uniformly delayed or offset to compensate for any latency resulting from the wireless connection between the electronic control unit and the haptic device(s), as well as processing time at each.

Going back to step 508, once data is received at the data port, the method 500 may continue to step 524, where the processor determines whether the received data control data for controlling operation of the haptic device(s) or configuration data for configuring the control unit. If the data is configuration data, the method 500 continues to step 526, where the processor processes the configuration data and performs appropriate functions or operations dictated by the data. If the data is control data, the method 500 continues to step 528, where the processor packetizes the data by partitioning the control data into a plurality of data packets. The method 500 may then continue to step 530, where the processor interleaves the data packets into the plurality of audio packets, and then to step 532, where the audio and data packets are provided to the wireless transceiver for transmission to the haptic device(s). In cases where control data is not received, the method 500 may continue from step 522 directed to step 532, where the plurality of audio packets are transmitted to the haptic device(s) via the wireless transceiver.

Going back to step 514, once the audio stream is provided to the audio path, the method 500 may continue to step 534, where a time delay is inserted into the audio stream of the audio path using a buffer (e.g., the buffer 320 shown in FIG. 3). The time delay can be based on the amount of latency calculated at step 520. For example, after completing step 520, the processor may provide the time delay to the buffer. From step 534, the method 500 continues to step 536, where the time-delayed audio stream is provided to the audio output device for delivery to the external audio listening device coupled to the audio output device. Thus, the time-delayed audio stream may be delivered by the audio listening device in synchrony with delivery of haptic signals by the haptic device(s).

Going back to step 510, once data is received from the haptic device(s), the method 500 may continue to step 538, where the received data is provided to the data port for transmission to the data source or other controller. For example, the data may include positional or movement data associated with movements or gestures detected by the haptic device(s), and these movements/gestures may be used as inputs to a video game or other audio-visual experience. The method 500 may end once all received data has been appropriately processed and transmitted.

FIG. 6 illustrates an example process or method 600 for facilitating synchronous delivery of an audio stream and haptic signals derived from the audio stream, in accordance with embodiments. The method 600 can be a carried out by a computing device, such as, for example, the haptic device 400 shown in FIG. 4. For example, the method 600 may be implemented, at least in part, by a processor of the computing device (e.g., the processor 406 shown in FIG. 4) executing a software application stored in a memory of the computing device (e.g., the memory 408 shown in FIG. 4). Further, to carry out the operations of the method 600, the computing device can interact with one or more other devices communicatively coupled thereto, such as, for example, an electronic control unit (e.g., the control unit 300 shown in FIG. 3) and/or another haptic device in wireless communication with the computing device (such as, e.g., the wearable haptic devices 110 and 112 shown in FIG. 1).

As shown in FIG. 6, the method 600 can begin at step 602 with establishing a wireless connection between at least one wearable haptic device and the electronic control unit using a wireless transceiver (e.g., the wireless transceiver 402 shown in FIG. 4) that is configured for short-range wireless communications. For example, the wireless transceiver may be a Bluetooth transceiver and may be used to wirelessly pair the haptic device with the electronic control unit and establish an L2CAP link with the control unit. In some cases, the wireless connection may be made in response to receiving an incoming connection request from the control unit.

At step 604, the processor maintains an input/output buffer (e.g., the buffer 410 shown in FIG. 4) at low levels (e.g., 10 samples or less) in order to keep processing-based latency within the haptic device low. In embodiments, the input/output buffer may be a single store for handling both incoming and outgoing data, or two separate stores, such as an input buffer and an output buffer.

At step 606, the haptic device receives, via the wireless transceiver, a plurality of audio packets from the electronic control unit. In some cases, the haptic device may receive a plurality of data packets along with the audio packets. For example, the data packets may be interleaved between the audio packets and sent over the same wireless connection. The data packets may include control data for controlling operation of one or more haptic transducers (e.g., the haptic transducer 404 shown in FIG. 4) included in the haptic device.

At step 608, the processor searches each packet for a sync word and a packet identifier. At step 610, the processor determines whether the packet is a data packet or an audio packet based on the packet identifier. If the packet is a data packet, the method 600 continues to step 612, where the processor processes the header of each data packet to identify a destination of the data packet. At step 614, based on the findings in step 612, the processor routes each data packet to a select one of a first haptic device (e.g., the first footwear device 210 shown in FIG. 2) and a second haptic device (e.g., the second footwear device 212 shown in FIG. 2). For example, in some cases, the audio content may include multi-channel audio, such as, for example, right channel audio and left channel audio. In such cases, the header information may indicate that the right channel audio should be provided to the footwear device worn on a right foot of the user, and the left channel audio should be provided to the footwear device worn on a left foot of the user.

Referring back to step 610, if the packet is an audio packet, the method 600 continues to step 616, where the processor retrieves time-to-play (TTP) data from the header of the audio packet, retrieves a current play time from an internal clock of the haptic device (e.g., a Bluetooth or wall clock), and based on both pieces of information, calculates new time-to-play value for the audio packet. At step 618, the processor removes the jitter that may naturally occur in a wireless transmission by, for example, calculating the difference between the current play time and the TTP value of a given audio packet and averaging this difference over 32 values.

At step 620, the method 600 includes managing buffer levels to ensure time to play for each of the audio packets. For example, if an audio packet is corrupt or late to play, the packet may be removed from the buffer to help maintain the TTP of other packets. As another example, if a packet arrives early, the silence or similar-sounding audio content may be added to the buffer to conceal the gap.

At step 622, the audio content is filtered to remove very low frequency components (e.g., below 20 Hz) and certain high frequency components (e.g., above 450 Hz). At step 624, the filtered audio content is provided to one or more of the haptic devices to generate haptic signals based on the audio content. The haptic signals may be output to the one or more haptic devices in accordance with the new TTP value calculated at step 616, so that the haptic signals are delivered to the user, via the haptic device, at the same time as the corresponding audio content (e.g., via the audio listening device). The method 600 may end once all received audio has been converted to haptic signals. In some cases, the method 600 may further include obtaining data associated with a movement detected by the one or more haptic transducer, and transmitting the movement data to the electronic control unit using the wireless transceiver.

The foregoing describes wireless communication devices for broadcasting data and receiving that broadcasted data. That data is described herein as being transmitted in packets. This terminology is used for convenience and ease of description. Packets can have different formats in different communications protocols, and some communications protocols use different terminology, such as, for example, "frames" or "messages" to denote data transmissions. Thus, it will be understood that the term "packet" is used herein to denote any signal, data or message transmitted over a wireless network.

Thus, the embodiments described herein provide a novel wireless communications protocol and communications layer for synchronizing delivery of different wireless signals by different devices, including audio signals delivered by an audio listening device and corresponding haptic signals delivered by one or more wearable haptic devices. While the examples shown and described herein pertain to an electronic control unit wirelessly coupled to the audio listening device and the one or more wearable haptic devices, and/or an entertainment system comprising these components, other implementations of the wireless communications protocol described herein are also contemplated.

For example, in one implementation, the latency-based synchronization techniques described herein can be used to synchronize delivery of audio and haptic signals by any number of different wirelessly-connected devices, including wearable devices and remotely-activated devices, in order to provide multi-sensory immersion. For example, co-owned International Patent Application No. PCT/US2016/025927, entitled "A Modular System for Building Variable Interactive Platforms and Enclosures for Deep Multisensory Immersion into Audio and Audio-Visual Entertainment," the entirety of which is incorporated herein by reference, describes panels (e.g., floor or wall panels) with embedded modules that synchronize audio with tactile vibration and/or emit one or more elements (e.g., water jets, water vapor, fragrances, air bursts, etc.) to provide deep multi-sensory immersion when the panels are used to construct a gaming or virtual reality enclosure. The wireless communication protocol described herein can be used to wirelessly link these panels to a central control unit, similar to the electronic control unit 300 shown in FIG. 3, and synchronize the delivery of audio content, haptic content, and/or other outputs by each of the panels within the enclosure.

In another example implementation, an audio recording system can include multiple control units, similar to the control unit 300 shown in FIG. 3, that are positioned adjacent to various audio sources. The control units can be configured to simultaneously record live sound emitted by respective audio sources and wirelessly transmit the captured sounds to a designated electronic device (e.g., a computer or mobile device) using the latency-corrected synchronization techniques described herein. For example, each control unit may be placed adjacent to a designated instrument in a music band, and the microphone in each control unit can be configured to capture the sounds produced by the designated instrument. The various instrument sounds can be wirelessly transmitted to a single audio recording device in a synchronized manner and used to create a multi-track recording comprised of individually-recorded instrument tracks. The audio recording device may further produce the recording or broadcast the recording in synchrony with live video content.

In still another example implementation, audio recorded by multiple control units (e.g., similar to the audio recording system described above) can be used to generate haptic events for a virtual reality system (e.g., a VR 360 system) and/or in conjunction with live video. For example, in a professional football game, each player may have one or more control units embedded into his protective gear and/or shoe soles and a 360 degree head camera embedded into his helmet. The control units can include microphones and/or pressure sensors to detect or measure forces associated with the player, for example, when running or colliding with other players. These forces can be provided to a person watching the game as live haptic feedback representing, for example, the cadence of the player's running or the impact of the collision, and using the latency-corrected synchronization techniques described herein, the live haptic feedback can be delivered to the person in synchrony with corresponding audio and video content from the game. As a result, a person watching a live game can simultaneously feel the physical aspects of the game, as if they are participating in the game themselves. In some cases, the live haptic vibrations gathered by such a system can be provided to a multi-channel haptic system, such as, for example, the multi-channel audio vibratory entertainment system described in co-owned U.S. Pat. No. 9,402,133, the contents of which are incorporated herein in its entirety, so that the vibrations are provided to appropriate areas of the user's body (e.g., running-related events are provided to a haptic transducer attached to the viewer's feet, events related to shoulder collisions are provided to a haptic transducer attached to the viewer's shoulder, etc.).

Any process descriptions or blocks in the figures, such as FIGS. 5 and 6, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. An electronic control unit, comprising:
   at least one input device for receiving audio content and data content from at least one external source;
   an audio splitter configured to split the audio content between: an audio path for providing the audio content as an audio output via an external audio listening device, and a haptic path for providing the same audio content as a haptic output via a plurality of wearable haptic devices;
   a wireless transceiver configured to transmit a first portion of the audio and data content to a first one of the wearable haptic devices using short-range wireless communication technology;
   a processor coupled to: the haptic path for receiving the audio content therefrom, the at least one input device for receiving the data content therefrom, and the wireless transceiver for providing the first portion of the audio and data content thereto, the processor being configured to:
     calculate an amount of latency due to the wireless transmission of the first portion of the audio and data content to the first one of the wearable haptic devices,
     partition the audio content into a plurality of audio packets, each audio packet including a time-to-play based on the calculated amount of latency,
     partition the data content into a plurality of data packets, the data content comprising control data for controlling operation of one or more of the wearable haptic devices,
     interleave the data packets into the plurality of audio packets, each of the data packets and the audio packets comprising header information configured to identify one of the wearable haptic devices as a destination of the packet,
     provide a first group of the interleaved audio and data packets to the wireless transceiver for transmission to the first one of the wearable haptic devices based on the destination included in the corresponding header information, the first group comprising the first portion of the audio and data content, and
     provide a second group of the interleaved audio and data packets to a second one of the wearable haptic devices based on the destination included in the corresponding header information, the second group comprising a second portion of the audio and data content different from the first portion;
   a buffer in communication with the processor and included in the audio path, the buffer configured to insert a time delay into the audio content provided to the audio path, the time delay being based on the calculated amount of latency; and
   an audio output device coupled to the buffer for outputting the time-delayed audio content to the external audio listening device.

2. The electronic control unit of claim 1, further comprising a low pass filter included in the haptic path for removing high frequency components from the audio content provided to the haptic path.

3. The electronic control unit of claim 1, wherein each audio packet further includes a sync word and an identifier associated with the audio packet.

4. The electronic control unit of claim 1, wherein the at least one input device comprises a data port coupled to the processor for receiving the data content from one or more external data sources.

5. The electronic control unit of claim 1, wherein the wireless transceiver is further configured to receive data captured by the first one of the wearable haptic devices.

6. The electronic control unit of claim 4, wherein the data port is a universal serial bus (USB) port.

7. The electronic control unit of claim 1, wherein the at least one input device comprises a microphone.

8. The electronic control unit of claim 1, wherein the wireless transceiver is a Bluetooth transceiver.

9. An entertainment system, comprising:
   a plurality of wearable haptic devices, each haptic device configured to convert a corresponding portion of audio content into haptic signals; and
   an electronic control unit comprising:
     at least one input device for receiving the audio content and data content from at least one external source, an audio output device for outputting the audio content to an external audio listening device, a processor for providing the same audio content and the data content to the wearable haptic devices, an audio splitter configured to receive the audio content from the at least one input device and provide the audio content to each of the audio output device and the processor, and a wireless transceiver coupled to the processor and configured to transmit a first portion of the audio and data content to a first one of the wearable haptic devices using short-range wireless communication technology, wherein the processor is configured to synchronize delivery of the haptic signals with delivery of the audio content to the audio listening device by:

calculating an amount of latency due to the wireless transmission of the first portion of the audio and data content to the first one of the wearable haptic devices, partitioning the audio content into a plurality of audio packets, each audio packet including a time-to-play based on the calculated amount of latency, partitioning the data content into a plurality of data packets, the data content comprising control data for controlling operation of one or more of the wearable haptic devices, interleaving the data packets into the plurality of audio packets, each of the data packets and the audio packets comprising header information configured to identify one of the wearable haptic devices as a destination of the packet, inserting a time delay into the audio content provided to the audio listening device, the time delay being based on the calculated amount of latency, providing a first group of the interleaved audio and data packets to the wireless transceiver for transmission to the first one of the wearable haptic devices based on the destination included in the corresponding header information, the first group comprising the first portion of the audio and data content, and providing a second group of the interleaved audio and data packets to a second one of the wearable haptic devices based on the destination included in the corresponding header information, the second group comprising a second portion of the audio and data content different from the first portion.

10. The entertainment system of claim 9, wherein the at least one input device comprises a data port communicatively coupled to the processor and configured to receive the data content from an external data source.

11. The entertainment system of claim 9, wherein each wearable haptic device is further configured to:

obtain data associated with a movement detected by the wearable haptic device, and transmit the data to the electronic control unit.

12. The entertainment system of claim 9, wherein the first one of the wearable haptic devices is a first footwear device comprising a first haptic transducer and the second one of the wearable haptic devices is a second footwear device comprising a second haptic transducer.

13. The entertainment system of claim 9, wherein the first one of the wearable haptic devices includes a second wireless transceiver for receiving the first portion of the audio and data packets from the electronic control unit.

14. The entertainment system of claim 13, wherein the wireless transceivers of the electronic control unit and the first one of the wearable haptic devices are Bluetooth transceivers.

15. The entertainment system of claim 9, wherein each wearable haptic device includes a second processor configured to calculate a new time-to-play value for each audio packet received from the electronic control unit based on the time-to-play included in the received audio packet and a current play time provided by an internal clock included in the wearable haptic device.

16. A method of synchronizing delivery of an audio stream with delivery of haptic signals derived from the audio stream, comprising:

establishing a wireless connection with a first one of a plurality of wearable haptic devices using a wireless transceiver configured for short-range wireless communications;

receiving audio content from an external audio source via at least one input device;

providing the same audio content to each of an audio path and a haptic path, the audio path coupled to a buffer and an audio output device, and the haptic path coupled to the wireless transceiver and a processor;

receiving, at the processor, data content from an external data source via the at least one input device;

calculating, using the processor, an amount of latency due to wireless transmission of a first portion of the audio and data content by the wireless transceiver to the first one of the wearable haptic devices;

partitioning, using the processor, the audio content of the haptic path into a plurality of audio packets, each audio packet including a time-to-play based on the calculated amount of latency;

partitioning, using the processor, the data content into a plurality of data packets, the data content comprising control data for controlling operation of one or more of the wearable haptic devices, interleaving, using the processor, the data packets into the plurality of audio packets, each of the data packets and the audio packets comprising header information configured to identify one of the wearable haptic devices as a destination of the packet, inserting, using the buffer, a time delay into the audio stream of the audio path, the time delay being based on the calculated amount of latency;

providing the time-delayed audio stream to the audio output device for delivery to an external audio listening device coupled to the audio output device;

transmitting, via the wireless transceiver, a first group of the interleaved audio and data packets to the first one of the wearable haptic devices based on the destination included in the corresponding header information; and providing, via the processor, a second group of the interleaved audio and data packets to a second one of the wearable haptic devices based on the destination included in the corresponding header information, the second group comprising a second portion of the audio and data content different from the first portion.

* * * * *